(12) United States Patent
Handlin, Jr. et al.

(10) Patent No.: US 7,282,536 B2
(45) Date of Patent: Oct. 16, 2007

(54) BLOCK COPOLYMERS AND METHOD FOR MAKING SAME

(75) Inventors: Dale L. Handlin, Jr., Houston, TX (US); Carl L. Willis, Houston, TX (US)

(73) Assignee: Kraton Polymers LLC, Houston, TX (US)

( * ) Notice: Subject to any disclaimer, the term of this patent is extended or adjusted under 35 U.S.C. 154(b) by 94 days.

(21) Appl. No.: 11/055,349

(22) Filed: Feb. 10, 2005

(65) Prior Publication Data

US 2005/0137349 A1 Jun. 23, 2005

Related U.S. Application Data

(62) Division of application No. 10/359,981, filed on Feb. 6, 2003.

(60) Provisional application No. 60/355,210, filed on Feb. 7, 2002.

(51) Int. Cl.
C08F 8/36 (2006.01)
C08F 297/04 (2006.01)

(52) U.S. Cl. .......... 525/88; 525/89; 525/280; 525/258; 525/316; 525/333.5; 525/338; 525/339; 525/353

(58) Field of Classification Search ............. 525/88.89, 525/280, 258, 316, 333.5, 338, 339, 353, 525/88, 89
See application file for complete search history.

(56) References Cited

U.S. PATENT DOCUMENTS

| | | |
|---|---|---|
| 2,975,160 A | 3/1961 | Zelinski |
| 3,149,182 A | 9/1964 | Porter |
| RE27,145 E | 6/1971 | Jones |
| 3,595,942 A | 7/1971 | Wald et al. |
| 3,600,250 A | 8/1971 | Evans |
| 3,634,549 A | 1/1972 | Shaw et al. |
| 3,670,054 A | 6/1972 | De La Mare et al. |
| 3,700,633 A | 10/1972 | Wald et al. |
| 4,073,831 A | 2/1978 | Tabana et al. |
| 4,089,913 A | 5/1978 | Miki et al. |
| 4,107,131 A | 8/1978 | Gergen et al. |
| 4,248,981 A | 2/1981 | Milkovich et al. |
| 4,367,325 A | 1/1983 | Takeuchi et al. |
| 4,412,087 A | 10/1983 | Trepka |
| 4,547,560 A | 10/1985 | Hattori et al. |
| 4,578,429 A | 3/1986 | Gergen et al. |
| 4,603,155 A | 7/1986 | Muramori et al. |
| 4,898,914 A | 2/1990 | Gergen et al. |
| 4,970,265 A | 11/1990 | Willis |
| 5,075,377 A | 12/1991 | Kawabuchi et al. |
| 5,191,024 A | 3/1993 | Shibata et al. |
| 5,206,300 A | 4/1993 | Chamberlain |
| 5,239,010 A | 8/1993 | Balas et al. |
| 5,276,101 A | 1/1994 | Chamberlain et al. |
| 5,290,875 A | 3/1994 | Moczygemba et al. |
| 5,306,779 A | 4/1994 | Shibata et al. |
| 5,346,964 A | 9/1994 | Shibata et al. |
| 5,506,299 A | 4/1996 | Gelles et al. |
| 5,516,831 A | 5/1996 | Pottick et al. |
| 5,545,690 A | 8/1996 | Trepka et al. |
| 5,603,155 A | 2/1997 | Satomi et al. |
| 5,679,482 A | 10/1997 | Ehrenberg et al. |
| 5,910,546 A | 6/1999 | Trepka et al. |
| 5,972,519 A | 10/1999 | Niessner et al. |
| 6,031,053 A | 2/2000 | Knoll et al. |
| 6,107,411 A | 8/2000 | Toya et al. |
| 6,110,616 A | 8/2000 | Sheikh-Ali et al. |
| 6,235,847 B1 | 5/2001 | Hoshi et al. |
| 6,521,712 B1 | 2/2003 | Knoll et al. |
| 6,759,454 B2 | 7/2004 | Stephens et al. |
| 2003/0149140 A1 | 8/2003 | Stephens et al. |
| 2003/0153681 A1 | 8/2003 | Handlin et al. |
| 2003/0166776 A1 | 9/2003 | Wright et al. |
| 2003/0181584 A1 | 9/2003 | Handlin et al. |
| 2003/0181585 A1 | 9/2003 | Handlin et al. |
| 2005/0171290 A1 | 8/2005 | Bening et al. |

FOREIGN PATENT DOCUMENTS

| | | |
|---|---|---|
| EP | 0 492 490 B1 | 8/1996 |
| EP | 0 796 871 A2 | 9/1997 |
| EP | 0 822 227 A1 | 2/1998 |
| EP | 0 877 038 A2 | 11/1998 |
| EP | 0 878 492 A1 | 11/1998 |
| EP | 0 879 836 A1 | 11/1998 |
| EP | 0 654 488 B1 | 1/1999 |
| EP | 0 398 758 B1 | 3/1999 |
| EP | 0 859 803 B1 | 12/1999 |
| EP | 0 766 706 B1 | 12/2001 |
| JP | 61-291610 | 12/1986 |
| JP | 6-271717 | 9/1994 |
| JP | 7-149952 | 6/1995 |
| WO | 00/58380 | 10/2000 |

*Primary Examiner*—James J. Seidleok
*Assistant Examiner*—Olga Asinovsky

(57) ABSTRACT

The present invention is a novel block copolymer containing a controlled distribution copolymer block of a conjugated diene and a mono alkenyl arene, where the controlled distribution copolymer block has terminal regions that are rich in conjugated diene units and a center region that is rich in mono alkenyl arene units. Also disclosed is a method for manufacture of the block copolymer.

14 Claims, 5 Drawing Sheets

Figure 1. Monomer distribution in Bd/S block of S-Bd/S-S Block Copolymer #3.

Figure 2. Monomer distribution in Bd/S block of S-Bd/S-S Block Copolymer 6.

Figure 3. Monomer distribution in Bd/S block of S-Bd/S-S Block Copolymer #7.

BLOCK COPOLYMERS AND METHOD FOR MAKING SAME

CROSS-REFERENCE TO RELATED APPLICATIONS

The present application is a divisional of U.S. patent application Ser. No. 10/359,981, filed Feb. 6, 2003, entitled Novel Block Copolymers and Method for Making Same.

The present application is related to commonly assigned U.S. patent application Ser. No. 10/359,906 entitled Polymer Modified Bitumen Compositions, now U.S. Pat. No. 6,759,454, commonly assigned U.S. patent application Ser. No. 10/359,907 entitled Articles Prepared From Hydrogenated Controlled Distribution Block Copolymers, now published as US2003/0181585 A1, commonly assigned U.S. patent application Ser. No. 10/359,927 entitled Adhesives and Sealants From Controlled Distribution Block Copolymers, now published as US2003/0176574 A1, commonly assigned U.S. patent application Ser. No. 10/359,953 entitled Articles Prepared From Controlled Distribution Block Copolymers, now published as US2003/0166776 A1, commonly assigned U.S. patent application Ser. No. 10/359,462 entitled Gels From Controlled Distribution Block Copolymers, now published as US2003/0153681 A1, all of which were filed Feb. 6, 2003 and commonly assigned International Patent Application Ser. No. PCT/NL03/00098 filed on Feb. 7, 2003 entitled Solvent-Free, Hot Melt Adhesive Composition Comprising a Controlled Distribution Block Copolymer, now published as WO 03/066769 A1, and commonly assigned U.S. patent application Ser. No. 10/209,285 filed Jul. 31, 2002 entitled Elastomeric Articles Prepared From Controlled Distribution Block Copolymers, now published as US2003/0181584 A1, all of which claim priority from U.S. Provisional Patent Application Ser. No. 60/355,210 filed Feb. 7, 2002.

FIELD OF THE INVENTION

This invention relates to novel anionic block copolymers of mono alkenyl arenes and conjugated dienes, and to the methods for making such block copolymers. In particular, the invention relates to anionic block copolymers where one of the blocks is a controlled distribution copolymer of a conjugated diene and mono alkenyl arene having a specific arrangement of the monomers in the copolymer block.

BACKGROUND OF THE INVENTION

The preparation of block copolymers is well known. In a representative synthetic method, an initiator compound is used to start the polymerization of one monomer. The reaction is allowed to proceed until all of the monomer is consumed, resulting in a living homopolymer. To this living homopolymer is added a second monomer that is chemically different from the first. The living end of the first polymer serves as the site for continued polymerization, thereby incorporating the second monomer as a distinct block into the linear polymer. The block copolymer so grown is living until terminated.

Termination converts the living end of the block copolymer into a non-propagating species, thereby rendering the polymer non-reactive toward monomer or coupling agent. A polymer so terminated is commonly referred to as a diblock copolymer. If the polymer is not terminated the living block copolymers can be reacted with additional monomer to form a sequential linear block copolymer. Alternatively the living block copolymer can be contacted with multifunctional agents commonly referred to as coupling agents. Coupling two of the living ends together results in a linear triblock copolymer having twice the molecular weight of the starting, living, diblock copolymer. Coupling more than two of the living diblock copolymer regions results in a radial block copolymer architecture having at least three arms.

One of the first patents on linear ABA block copolymers made with styrene and butadiene is U.S. Pat. No. 3,149,182. These polymers in turn could be hydrogenated to form more stable block copolymers, such as those described in U.S. Pat. Nos. 3,595,942 and Re. 27,145. In some cases what was desired was a random copolymer, such as an SBR, rather than a block copolymer. Random styrene butadiene copolymers or SBR are disclosed in U.S. Pat. Nos. 2,975,160, 4,547,560, 4,367,325 and 5,336,737.

Inventors desiring a low melt viscosity in block copolymers considered the use of random styrene and butadiene blocks, as disclosed in U.S. Pat. No. 3,700,633. One means of introducing transparency to block copolymers was to also provide for random blocks, such as in U.S. Pat. Nos. 4,089,913, 4,122,134 and 4,267,284.

When preparing random blocks of styrene and butadiene, so-called "tapered" blocks would result due to the fact that butadiene copolymerizes at a faster rate than does styrene. See, e.g. U.S. Pat. Nos. 5,191,024, 5,306,779 and 5,346,964. So in U.S. Pat. No. 4,603,155 the patentee prepared a block comprising multiple tapered blocks to achieve a more random copolymer. But in many cases the patentee relies on the continuous addition of both monomers or the use of randomizing agents to achieve a more random structure. Such techniques are disclosed in U.S. Pat. Nos. 3,700,633 and 4,412,087 and German patent applications DE 4420952, DE 19615533, DE 19621688, DE 195003944, DE 19523585, and DE 19638254. However, some randomizing agents will poison hydrogenation catalysts, and make the subsequent hydrogenation of the polymers difficult or impossible, so such randomizing agents must be avoided. Randomization agents containing N atoms are particularly prone to this problem.

While some improvements in properties have been made, it would be significant if it were possible to increase the stretching stiffness of a styrene/diene block copolymer without increasing the plasticity. What is also desired is a polymer having an increased polarity, while also having significantly lower melt and solution viscosity. Applicants have found that these improvements can be achieved by designing a polymer having a different structure in the diene block, wherein undesirable blockiness is avoided and undesirable effects occurring during post-polymerization hydrogenation treatments are also reduced or avoided.

SUMMARY OF THE INVENTION

The present invention broadly comprises a block copolymer having at least one A block and at least one B block, wherein:

a. each A block is a mono alkenyl arene polymer block and each B block is a controlled distribution copolymer block of at least one conjugated diene and at least one mono alkenyl arene;

b. each A block independently having a number average molecular weight between about 3,000 and about 60,000 and each B block independently having a number average molecular weight between about 30,000 and about 300,000;

c. each B block comprises terminal regions adjacent to the A block that are rich in conjugated diene units and one or more regions not adjacent to the A blocks that are rich in mono alkenyl arene units;

d. the total amount of mono alkenyl arene in the block copolymer is about 20 percent weight to about 80 percent weight; and e. the weight percent of mono alkenyl arene in each B block is between about 10 percent and about 75 percent.

This block copolymer may be hydrogenated partially, selectively, or fully. In a preferred embodiment the block copolymer will have a Young's modulus of less than 2,800 psi (20 MPa) and a rubber modulus or slope between 100 and 300% elongation of greater than 70 psi (0.5 MPa). Such properties are not to be found in polymers of the prior art.

Accordingly, in one aspect, the present invention relates to an unhydrogenated block copolymer having the general configuration A-B, A-B-A, $(A-B)_n$, $(A-B-A)_n$, $(A-B-A)_nX$, $(A-B)_nX$ or mixtures thereof, where n is an integer from 2 to about 30, and X is coupling agent residue and wherein:

a. each A block is a mono alkenyl arene polymer block and each B block is a controlled distribution copolymer block of at least one conjugated diene and at least one mono alkenyl arene;

b. each A block having a number average molecular weight between about 3,000 and about 60,000 and each B block having a number average molecular weight between about 30,000 and about 300,000;

c. each B block comprises terminal regions adjacent to the A block that are rich in conjugated diene units and one or more regions not adjacent to the A blocks that are rich in mono alkenyl arene units;

d. the total amount of mono alkenyl arene in the block copolymer is about 20 percent weight to about 80 percent weight; and e. the weight percent of mono alkenyl arene in each B block is between about 10 percent and about 75 percent.

In another aspect, the present invention relates to a hydrogenated block copolymer having the general configuration A-B, A-B-A, $(A-B)_n$, $(A-B-A)_n$, $(A-B-A)_nX$, $(A-B)_nX$ or mixtures thereof where n is an integer from 2 to about 30, and X is coupling agent residue and wherein:

a. prior to hydrogenation each A block is a mono alkenyl arene polymer block and each B block is a controlled distribution copolymer block of at least one conjugated diene and at least one mono alkenyl arene;

b. subsequent to hydrogenation about 0–10% of the arene double bonds have been reduced, and at least about 90% of the conjugated diene double bonds have been reduced;

c. each A block having a number average molecular weight between about 3,000 and about 60,000 and each B block having a number average molecular weight between about 30,000 and about 300,000;

d. each B block comprises terminal regions adjacent to the A block that are rich in conjugated diene units and one or more regions not adjacent to the A block that are rich in mono alkenyl arene units;

e. the total amount of mono alkenyl arene in the hydrogenated block copolymer is about 20 percent weight to about 80 percent weight; and f. the weight percent of mono alkenyl arene in each B block is between about 10 percent and about 75 percent.

If desired the A blocks may also be fully saturated such that at least about 90% of the arene double bonds have been reduced. Also, if desired the saturation of the diene blocks may be reduced such that anywhere from 25 to 95% of the diene double bonds are reduced. Still further, it is also possible to saturate only those double bonds that have a vinyl linkage.

In still another aspect, the present invention comprises a block copolymer having at least one A block, at least one B block and at least one C block, wherein:

a. each A block is a mono alkenyl arene polymer block, each B block is a controlled distribution copolymer block of at least one conjugated diene and at least one mono alkenyl arene, and each C block is a polymer block of one or more conjugated dienes;

b. each A block having a number average molecular weight between about 3,000 and about 60,000, each B block having a number average molecular weight between about 30,000 and about 300,000, and each C block having a number average molecular weight between about 2,000 and about 200,000;

c. each B block comprises terminal regions adjacent to the A block that are rich in conjugated diene units and one or more regions not adjacent to the A blocks that are rich in mono alkenyl arene units;

d. the total amount of mono alkenyl arene in the block copolymer is about 20 percent weight to about 80 percent weight; and e. the weight percent of mono alkenyl arene in each B block is between about 10 percent and about 75 percent.

This block copolymer may also be hydrogenated selectively, fully or partially.

In yet another aspect, the present invention comprises a tetrablock copolymer having the structure $A_1$-$B_1$-$A_2$-$B_2$, wherein:

a. each $A_1$ and $A_2$ block is a mono alkenyl arene polymer block, each $B_1$ block is a controlled distribution copolymer block of at least one conjugated diene and at least one mono alkenyl arene, and each $B_2$ block is selected from the group consisting of (I) a controlled distribution copolymer block of at least one conjugated diene and at least one mono alkenyl arene (ii) a homopolymer block of a conjugated diene and (iii) a copolymer block of two or more different conjugated dienes;

b. each $A_1$ and $A_2$ block having a number average molecular weight between about 3,000 and about 60,000, each $B_1$ block having a number average molecular weight between about 30,000 and about 300,000, and each $B_2$ block having a number average molecular weight between 2,000 and 40,000;

c. each $B_1$ block comprises terminal regions adjacent to the A block that are rich in conjugated diene units and one or more regions not adjacent to the A blocks that are rich in mono alkenyl arene units;

d. the total amount of mono alkenyl arene in the block copolymer is about 20 percent weight to about 80 percent weight; and e. the weight percent of mono alkenyl arene in each $B_1$ block is between about 10 percent and about 75 percent.

This tetrablock copolymer may be hydrogenated selectively, fully or partially.

Applicants also claim as their invention processes for making such polymers. One of the processes comprises:

a. polymerizing a mono alkenyl arene in a first reactor in the presence of an inert hydrocarbon solvent and an organolithium initiator whereby a living polymer block A1 terminated with a lithium ion is formed;

b. adding to a second reactor an inert hydrocarbon solvent, 80 to 100% of the mono alkenyl arene monomer desired in the copolymer block B1, between 10 and 60% of the conjugated diene monomer desired in the copolymer block B1, and a distribution agent;

c. transferring the living homopolymer block A1 to the second reactor and starting the polymerization of the mono alkenyl arene monomer and conjugated diene monomer added in step b; and d. after about 5 to about 60 mol percent of the monomers of step c have been polymerized, continuously adding the remaining amount of conjugated diene monomer and mono alkenyl arene to the second reactor at a rate that maintains the concentration of the conjugated diene monomer at not less than about 0.1% weight until about 90% of the monomers in block B1 have been polymerized. It is preferable that less than 20% by weight of the unreacted monomer present at the end of the continuous addition be comprised of mono alkenyl arenes most preferable, less than 15%, thereby forming a living block copolymer A1B1.

Another process of the present invention involves:

a. polymerizing a mono alkenyl arene in a first reactor in the presence of an inert hydrocarbon solvent and an organolithium initiator whereby a living polymer block A1 terminated with a lithium ion is formed;

b. prior to the completion of the polymerization in step a, adding to the reactor in one aliquot between 40 and 60% of the conjugated diene monomer desired in the copolymer block B1, and an effective amount of a distribution agent and continuing the polymerization of the mono alkenyl arene monomer and conjugated diene monomer;

c. after about 10 to about 60 mole % of the monomers of step b have been polymerized, gradually adding the remaining amount of conjugated diene monomer and mono alkenyl arene to the reactor at a rate that maintains the concentration of the conjugated diene monomer at no less than about 0.1% weight until about 90% of the monomers in block B1 have been polymerized, thereby forming a living copolymer block copolymer A1B1; and d. adding additional mono alkenyl arene monomer to the reactor, thereby forming a living copolymer A1B1A2, wherein the A1 block and the A2 block each has a number average molecular weight of about 3,000 to about 60,000 and the B1 block has a number average molecular weight of about 30,000 to about 300,000.

In an alternative embodiment, the mono alkenyl arene monomer in block A1 is polymerized to completion, and mono alkenyl arene monomer and conjugated diene monomer are charged simultaneously, but the mono alkenyl arene monomer is charged at a much faster rate.

DETAILED DESCRIPTION OF THE INVENTION

Figure 1:
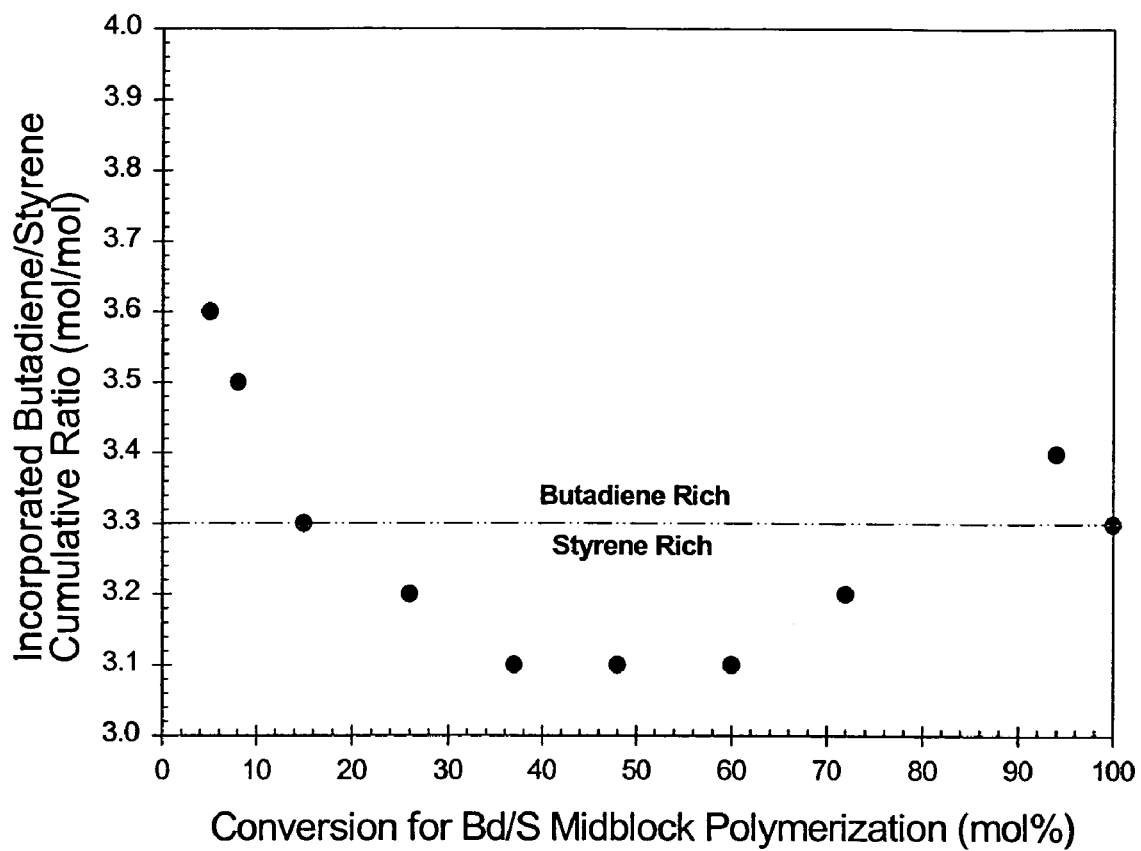
FIGS. 1, 2 and 3 shows the distribution of styrene and butadiene in the midblock of three separate S—S/Bd-S block copolymers. As shown in the Figures, the controlled distribution copolymer block of the present invention is characterized by the presence of butadiene rich regions on the ends of the block and styrene rich regions near the middle or center of the controlled distribution block.

The present invention offers novel compositions and methods of preparing such in copolymerizing alkenyl arenes and dienes as part of a mono alkenyl arene/conjugated diene block copolymer. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times (Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately-constituted controlled distribution copolymer region will tend to improve flow and processability. Modification of certain other properties is also achievable.

In a preferred embodiment of the present invention, the subject controlled distribution copolymer block has two distinct types of regions—conjugated diene rich regions on the end of the block and a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block and then decreases gradually until the polymer block is fully polymerized. This structure is distinct and different from the tapered and/or random structures discussed in the prior art.

Anionic, solution copolymerization to form the controlled distribution copolymers of the present invention can be carried out using, to a great extent, known and previously employed methods and materials. In general, the copolymerization is attained anionically, using known selections of adjunct materials, including polymerization initiators, solvents, promoters, and structure modifiers, but as a key feature of the present invention, in the presence of a certain distribution agent. Such distribution agent is, in preferred embodiments, a non-chelating ether. Examples of such ether compounds are cyclic ethers such as tetrahydrofuran and tetrahydropyrane and aliphatic monoethers such as diethyl ether and dibutyl ether. In some cases, particularly where the vinyl content of the conjugated diene is to be over 50%, it may be necessary to use a chelating agent, including dialkyl ethers of ethylene glycol and aliphatic polyethers such as diethylene glycol dimethyl ether and diethylene glycol diethyl ether. Other distribution agents include, for example, ortho-dimethoxybenzene or "ODMB", which is sometimes referred to as a chelating agent. Preferably the ether is an aliphatic monoether, and more preferably diethyl ether. Such copolymerization can be conducted as a batch, semi-batch, or continuous preparation, with batch being most preferred, but regardless, it is important that the randomization agent be present in the selected solvent prior to or concurrent with the beginning of the copolymerization process.

The introduction of the distribution agent counteracts the preference of the growing chain end to attach to one monomer over another. For example, in the case of styrene and a diene, the preference would be toward the diene. This distribution agent operates to promote more efficient "controlled distribution" copolymerization of the two monomers because the living chain end "sees" one monomer approximately as easily as it "sees" the other. The polymerization process is thereby "tuned" to allow incorporation of each of the monomers into the polymer at nearly the same rate. Such a process results in a copolymer having no "long runs" of either of the monomer components—in other words, a controlled distribution copolymer as defined hereinabove. In the preferred process, the mono alkenyl arene monomer will be nearly consumed by the time that the slow addition of the second aliquot of diene is complete, so that the polymerization ends rich in the conjugated diene. Short blocks of the conjugated diene monomer may be formed throughout the polymerization, but blocks of the mono alkenyl arene monomer are only formed when the concentration of the conjugated diene monomer becomes quite low. Under the preferred conditions, the cumulative percentage of the mono alkenyl arene monomer in the B block peaks at about 40%–60% overall conversion, but only exceeds the final value by about 25%–30%. The result of this relatively uniform distribution of monomers is a product having a single Tg, which is a weighted average of the Tg values of the two corresponding homopolymers.

As noted above, the distribution agent is preferably a non-chelating ether. By "non-chelating" is meant that such ethers will not chelate with the growing polymer, that is to say, they will not form a specific interaction with the chain end, which is derived from the initiator compound (e.g., lithium ion). Because the non-chelating ethers used in the present invention operate by modifying the polarity of the entire polymerization charge, they are preferably used in relatively large concentrations. Where diethyl ether, which is preferred, is selected, it is preferably at a concentration from about 0.5 to about 10 percent, preferably about 1 to about 10 percent, by weight of the polymerization charge (solvent and monomers), and more preferably from about 3 to about 6 percent by weight. Higher concentrations of this monoether can alternatively be used, but appear to increase cost without added efficacy. When the distribution agent is ODMB, the amount used is typically about 20 to about 400 parts by million weight ("PPMW"), based on the total reactor contents, preferably about 20 to about 40 PPMW for low vinyl products and about 100 to 200 PPMW for higher vinyl products.

An important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis. For selectively hydrogenated block copolymers, preferably about 30 to about 70 mol percent of the condensed butadiene units should have 1,2 configuration. For unsaturated block copolymers, preferably about 20 to about 40 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic copolymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the novel copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 30° to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

As discussed above, an important discovery of the present invention is the control of the monomer feed during the polymerization of the controlled distribution block. To minimize blockiness, it is desirable to polymerize as much of the styrene as possible in the presence of butadiene. Towards that end, a preferred process adds the styrene charge as quickly as possible, while adding the butadiene slowly, so as to maintain a concentration of no less than about 0.1% wt of butadiene for as long as possible, preferably until the styrene is nearly exhausted. If the butadiene falls below this level, there is a risk that a styrene block will form at this point. It is generally undesirable to form a styrene block during the butadiene charge portion of the reaction.

In a two—reactor polymerization scheme, this is most readily accomplished by adding about 80 to 100 percent of the mono alkenyl arene to the second reactor, along with about 10 to about 60 percent of the conjugated diene. The monomers are then caused to start polymerization via transfer of the living polymer from the first reactor. After about 5 to 60 mol percent of the monomers have polymerized, the remaining portion of the mono alkenyl arene (if any) is added and the remaining conjugated diene monomer is added at a rate that maintains the concentration of the conjugated diene monomer at no less than about 0.1% weight. The rate of diene monomer addition will be determined by the styrene content of the midblock, the reaction temperature and the type and concentration of the distribution control agent used. Reaction rates are relatively fast in the presence of 6%–10% diethyl ether. In this system, the diene is typically charged over 15 to 60 minutes. Rates for both monomers are slower in the presence of 0.5%–1% diethyl ether or 35–40 PPM o-dimethoxybenzene. In this solvent system, it is more typical to add the diene over 60 to 90 minutes. The higher the midblock styrene, the more advantageous it is to add the diene slowly. If the polymer is to be prepared in a fully sequential process, it is preferable to ensure that the butadiene addition continues until about 90% of the monomers in block B1 have been polymerized, and the percentage of the mono alkenyl arene monomer in the non-reacted monomer pool has been reduced to less than 20% weight, preferably less than 15% weight. In this way the formation of styrene blocks is prevented throughout the majority of the polymerization and there is sufficient conjugated diene left at the end of the polymerization to ensure that the terminal region of the B1 block is richer in the diene monomer. The resulting polymer block has diene rich regions near the beginning and the end of the block and an arene rich region near the center of the block. In products of the preferred process, typically the first 15 to 25% and the last 75 to 85% of the block are diene rich, with the remainder considered to be arene rich. The term "diene rich" means that the region has a measurably higher ratio of diene to arene than the center region. Another way to express this is the proportion of mono alkenyl arene units increases gradually along the polymer chain to a maximum near the middle or center of the block and then decreases gradually until the polymer block is fully polymerized. In a preferred embodiment, all of the mono alkenyl arene and about 10 to 20 percent of the conjugated diene are charged to the reactor, and the remainder of the conjugated diene is added after about 5 to about 10 percent of the original monomers have polymerized.

It is typically possible to achieve the desired distribution of the arene monomer in the final product using the process described above if fairly high levels of the distribution control agent are used. At higher midblock styrene levels and low levels of the distribution control agent, some blockiness is unavoidable. It is preferable to prepare these products by coupling. This insures that any blocky styrene that is formed is located at some distance from the endblocks. When polymers of the present invention are prepared by coupling, it is preferable to reserve 5% to 10% of the diene monomer, and add this charge once the polymerization of the arene monomer is complete. This ensures that all of the chains end in a diene unit. The living diene chain ends generally react more efficiently with coupling agents.

If the products of the present invention are being prepared in a single reactor process in which all of the B1 monomer is charged to a reactor containing the living A block, it is preferable to start the diene monomer addition about 1 minute before starting the arene monomer addition. It is also preferable to charge both monomers rapidly at first and then decrease the diene addition rate once the majority of the arene monomer has been added. This process ensures that the initial region of the B1 block will be rich in the diene monomer, and builds a large enough pool to avoid becoming starved in the diene monomer early in process step. As discussed above, the optimal rates will depend on the styrene content of the midblock, the reaction temperature and the type and concentration of the distribution control agent used.

For the controlled distribution or B block the weight percent of mono alkenyl arene in each B block is between about 10 weight percent and about 75 weight percent, preferably between about 25 weight percent and about 50 weight percent for selectively hydrogenated polymers.

As used herein, "thermoplastic block copolymer" is defined as a block copolymer having at least a first block of one or more mono alkenyl arenes, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer, tetra-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as endblocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_n X$, or both types of structures can be combined in a mixture. In addition it is contemplated that asymmetrical, polymodal block copolymers are included, where some of the A blocks have higher molecular weights than some of the other A blocks—e.g., such a polymer could have the structure $(A_1-B)_d-X-_e(B-A_2)$ where d is 1 to 30 and e is 1 to 30, and the molecular weight of A1 and A2 blocks differ by at least 20 percent. Some A-B diblock polymer can be present but preferably at least about 70 weight percent of the block copolymer is A-B-A or radial (or otherwise branched so as to have 2 or more terminal resinous blocks per molecule) so as to impart strength.

Preparation of radial (branched) polymers requires a post-polymerization step called "coupling". In the above radial formula n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlrohydrin.

Additional possible post-polymerization treatments that can be used to further modify the configuration of the polymers and therefore their properties include capping and chain-termination. Capping agents, such as ethylene oxide, carbon dioxide, or mixtures thereof serve to add functional groups to the chain ends, where they can then serve as reaction sites for further property-modifying reactions. In contrast, chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used. Alternatively, the living copolymer may simply be hydrogenated to deactivate the metal sites.

The polymerization procedures described hereinabove, including preparation of the diene/alkenyl arene copolymer and of di-block and multi-block copolymers prepared therewith, can be carried out over a range of solids content, preferably from about 5 to about 80 percent by weight of the solvent and monomers, most preferably from about 10 to about 40 weight percent. For high solids polymerizations, it is preferable to add any given monomer, which may include, as previously noted, a previously prepared homopolymer or copolymer, in increments to avoid exceeding the desired polymerization temperature. Properties of a final tri-block polymer are dependent to a significant extent upon the resulting alkenyl content and diene content. It is preferred that, to ensure significantly elastomeric performance while maintaining desirably high Tg and strength properties, as well as desirable transparency, the tri-block and multi-block polymer's alkenyl arene content is greater than about 20% weight, preferably from about 20% to about 80% weight. This means that essentially all of the remaining content, which is part of the diene/alkenyl arene block, is diene.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2$ X block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as number average molecular weight.

An important feature of the thermoplastic elastomeric di-block, tri-block and tetra-block polymers of the present invention, including one or more controlled distribution diene/alkenyl arene copolymer blocks and one or more mono alkenyl arene blocks, is that they have at least two Tg's, the lower being the single Tg of the controlled distribution copolymer block which is an intermediate of its constituent monomers' Tg's. Such Tg is preferably at least about −60 degrees C., more preferably from about −40 degrees C. to about +30 degrees C., and most preferably from about −40 degrees C. to about +10 degrees C. The second Tg, that of the mono alkenyl arene "glassy" block, is preferably from about +80 degrees C. to about +110 degrees C., more preferably from about +80 degrees C. to about +105 degrees C. The presence of the two Tg's, illustrative of the microphase separation of the blocks, contributes to the notable elasticity and strength of the material in a wide variety of applications, and its ease of processing and desirable melt-flow characteristics.

It should be noted that, in yet another embodiment of the present invention, additional property improvements of the compositions hereof can be achieved by means of yet another post-polymerization treatment, that of hydrogenation of the block copolymer. The preferred hydrogenation is selective hydrogenation of the diene portions of the final block copolymer. Alternatively both the B blocks and the A blocks may be hydrogenated, or merely a portion of the B blocks may be hydrogenated. Hydrogenation generally improves thermal stability, ultraviolet light stability, oxidative stability, and, therefore, weatherability of the final polymer. A major advantage of the present invention is that the distribution agent, such as the non-chelating monoether, which is present during the initial polymerization process, does not interfere with or otherwise "poison" the hydrogenation catalyst, and thus the need for any additional removal steps is obviated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

Once the hydrogenation is complete, it is preferable to extract the catalyst by stirring with the polymer solution a relatively large amount of aqueous acid (preferably 20–30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831. All of the patents mentioned in this paragraph are incorporated by reference into this application.

The last step, following all polymerization(s) as well as any desired post-treatment processes, is a finishing treatment to remove the final polymer from the solvent. Various means and methods are known to those skilled in the art, and include use of steam to evaporate the solvent, and coagulation of the polymer followed by filtration. The final result is a "clean" block copolymer useful for a wide variety of challenging applications, according to the properties thereof. These properties include, for example, the final polymer's stress-strain response, which shows that a composition of the present invention exhibits a stiffer rubbery response to strain, therefore requiring more stress to extend the same length. This is an extremely useful property that allows the use of less material to achieve the same force in a given product. Elastic properties are also modified, exhibiting increasing modulus with increasing elongation, and there is a reduced occurrence of the rubbery plateau region where large increases in elongation are required to procure an increase in stress. Another surprising property is increased tear strength. The controlled distribution copolymers of the present invention offer additional advantage in their ability to be easily processed using equipment generally designed for processing thermoplastic polystyrene, which is one of the most widely known and used alkenyl arene polymer. Melt processing can be accomplished via extrusion or injection molding, using either single screw or twin screw techniques that are common to the thermoplastics industry. Solution or spin casting techniques can also be used as appropriate.

The polymers of the present invention are useful in a wide variety of applications including, for example, molded and extruded goods such as toys, grips, handles, shoe soles, tubing, sporting goods, sealants, gaskets, and oil gels. The compositions also find use as rubber toughening agents for polyolefins, polyamides, polyesters and epoxy resins. Improved elasticity when compared with conventional styrenic block copolymers makes these copolymers particularly useful for adhesives, including both pressure-sensitive and hot-melt adhesives.

A particularly interesting application is thermoplastic films which retain the processability of styrenic block copolymers but exhibit a higher "elastic power" similar to spandex polyurethanes. As compounded with polyethylene or with a combination of tackifying resin and polyethylene, the controlled distribution copolymers of the present invention can meet these performance expectations. The resultant films show significant improvements in puncture resistance and strength, and reduced viscosity, when compared with common styrene/ethylene-butylene block copolymers. The same controlled distribution styrene/butadiene (20/80 wt/wt)

copolymer can also be formulated in a film compound with oil and polystyrene, wherein it exhibits higher strength and improved energy recovery and transparency in comparison with a control formulation based on a styrene/ethylene-butylene/styrene block copolymer. In molding applications formulated using oil and polypropylene, reduced viscosity and coefficients of friction also offer expansion in applications such as cap seals, which may be able to be produced without undesirable slip agents which may bloom and contaminate contents.

Finally, the copolymers of the present invention can be compounded with other components not adversely affecting the copolymer properties. Exemplary materials that could be used as additional components would include, without limitation, pigments, antioxidants, stabilizers, surfactants, waxes, flow promoters, solvents, particulates, and materials added to enhance processability and pellet handling of the composition.

The following examples are intended to be illustrative only, and are not intended to be, nor should they be construed as being, limitative in any way of the scope of the present invention Illustrative Embodiment #1

In Illustrative Embodiment #1, various controlled distribution copolymers of the present invention were prepared according to the process claimed herein. All polymers were selectively hydrogenated ABA block copolymers where the A blocks were polystyrene blocks and the B block prior to hydrogenation was a styrene/butadiene controlled distribution block copolymer having terminal regions that are rich in butadiene units and a center region that was rich in styrene units. The polymers were hydrogenated under standard conditions such that greater than 95% of the diene double bonds in the B block have been reduced.

The following describes the general procedure used to effectively control the distribution of the comonomers in the anionic copolymerization of 1,3-butadiene (Bd) and styrene (S) in the presence of diethyl ether (DEE). A number of tri-block copolymers were synthesized stepwise in cyclohexane. Di-ethyl ether ("DEE") was used to control the distribution of copolymerization of styrene and butadiene in the rubber midblock. During the copolymerization step, a number of samples were collected as the reaction progressed to enable H-NMR characterization of the degree of comonomer distribution.

For Step I, an appropriate amount of polymerization grade cyclohexane was charged to a well-mixed 227 liter stainless steel reactor vessel at 30° C. Pressure in the reactor vessel was controlled with nitrogen gas. Styrene monomer was charged to the reactor at 30° C. 10 ml increments of sec-butyllithium (12 wt.) were added to the reactor to titrate the cyclohexane and styrene monomer mixture. The titration endpoint was determined with an on-line colorimeter. After titration, sec-butyllithium was then added to the reactor to initiate the anionic polymerization of the living polystyrene blocks. The temperature was allowed to increase to 55° C. and the reaction was carried out to 99.9% conversion of the styrene. This completed the first styrene block of this block copolymer, (S)—.

For Step II, an appropriate amount of polymerization grade cyclohexane was charged to a well-mixed 492 liter stainless steel reactor vessel at 30° C. First, all of the styrene monomer required in the Step II reaction was charged to the reactor. Second, one-half of the butadiene monomer required in the Step II reaction was charged to the reactor. Third, an appropriate amount of diethyl ether was charged to the reactor. Fourth, 10 ml increments of sec-butyllithium (12% wt.) were added to the reactor to titrate the cyclohexane, styrene monomer, butadiene monomer and diethyl ether mixture. The titration endpoint was determined with an on-line colorimeter. After titration of the Step II recatonts, the living polystyrene chains were transferred via nitrogen pressure from the Step I reactor vessel to the Step II reactor vessel to initiate the Step II copolymerization reaction of styrene and butadiene at 30° C. Ten minutes after the initiation of the copolymerization, the remaining one-half of the butadiene monomer was dosed to the Step II reactor at a rate that kept the overall polymerization rate nearly constant. The temperature was allowed to increase to 55° C. and the reaction was carried out to 99.9% conversion basis butadiene kinetics. This completed the addition of a styrene-butadiene randomized midblock to the Step I polystyrene block. The polymer structure at this point is (S)—(S/Bd)-.

For Step III, more styrene monomer was charged to the Step II reactor vessel at 55° C. to react with the living (S)—(S/Bd)-polymer chains. The Step III reaction was maintained at near isothermal conditions until 99.9% conversion of the styrene. The living polymer chains were terminated by adding an appropriate amount (about 10% molar excess) of high-grade methanol to the final reactor solution. The final polymer structure was (S)—(S/Bd)-(S). All polymers were then selectively hydrogenated to produce linear ABA block copolymers where the A blocks were polystyrene blocks and the B block prior to hydrogenation was a styrene butadiene controlled distribution block having terminal regions that are rich in butadiene units and a center region that was rich in styrene units. The various polymers are shown in Table 1 below. Step I MW is the molecular weight of the first A block, Step II MW is the molecular weight of the AB blocks and Step III MW is the molecular weight of the ABA blocks. The polymers were hydrogenated such that greater than about 95% of the diene double bonds have been reduced.

This type of experiment was executed 19 times over a range of varying styrene-butadiene midblock compositions. The analytical results from each of the 19 experiments (polymers 1 to 15 and 24 to 27) are given in Table 1 and Table 1a. The conditions for polymerization for each of the first 8 experiment are given in Table 2. The conditions for polymerization of the other 11 polymers were similar to those for the first 8. Table 3 shows the polymer architecture for the various polymers. Polymer 28 is selectively hydrogenated AB diblock copolymer. Where the polystyrene A block is polymerized first, followed by the requested polymerization of the controlled distribution styrene/butadiene B block, followed by hydrogenation of the diene double bonds.

The following describes the method used to characterize the polymer mid or "B" block. It is the nature of the polymerization that the polymer mid-block is formed after an initial styrene block. Since the polymer mid-block which is formed in Step II cannot be analyzed in isolation, it must be analyzed in combination with the Step I styrene block, and the contribution of the Step I styrene block must be subtracted from the sum to determine the parameters which characterize the polymer mid-block. Four experimental quantities are used to calculate the percent styrene content in the polymer mid-block (Mid PSC) and the percent blocky styrene in the polymer mid-block (Mid Blocky). (Note: %

BD12 for the mid-block is measured directly with no need to correct for a BD contribution from the Step I styrene block). The experimental quantities and the method of calculation will be illustrated using polymer example #15. The four key experimental quantities for polymer example #15 are:

| | |
|---|---|
| GPC Step I MW: | 9.0 k |
| GPC Step II MW: | 86.8 k |
| NMR Step II PSC: | 33.4 wt % |
| NMR Step II blocky styrene: | 33% | where Step I consists of the Step I styrene block, and Step II is the combination of the Step I styrene block and the styrene/butadiene mid-block.

The total styrene mass in Step II is given by:

33.4 wt % of 86.8 k=29.0 k styrene in Step II

The styrene mass of the mid-block is found by subtracting the Step I styrene mass from the styrene in Step II:

29.0 k−9.0 k=20.0 k styrene in mid-block

The mass of the mid-block is given by subtracting the Step I MW from the Step II MW:

86.8 k−9.0 k=77.8 k mass if mid-block

The "Mid PSC" is the percent of mid-block styrene relative to the mid-block mass:

100*20.0 k mid-block styrene/77.8 k mid-block mass=25.7 wt %

The blocky styrene % and the Step II styrene mass give the mass of blocky styrene:

33% of 29.0 k=9.6 k Step II blocky styrene

The Step I styrene block is subtracted from the mass of Step II blocky styrene to give the mass of blocky styrene in the mid-block:

9.6 k Step II blocky styrene−9.0 k Step I styrene block=0.6 k

The "Mid Blocky" is the percent of blocky styrene in the mid-block relative to the styrene in the mid-block:

100*0.6 k mid-block blocky styrene/20.0 k mid-block styrene=3%

The calculated value for styrene blockiness in the B mid-block ("Mid Blocky") for all polymers described in this Illustrative Embodiment is shown in Table 1a. Also shown is the calculated percent styrene in each B mid-block ("Calc. Mid PSC").

Figure 2:
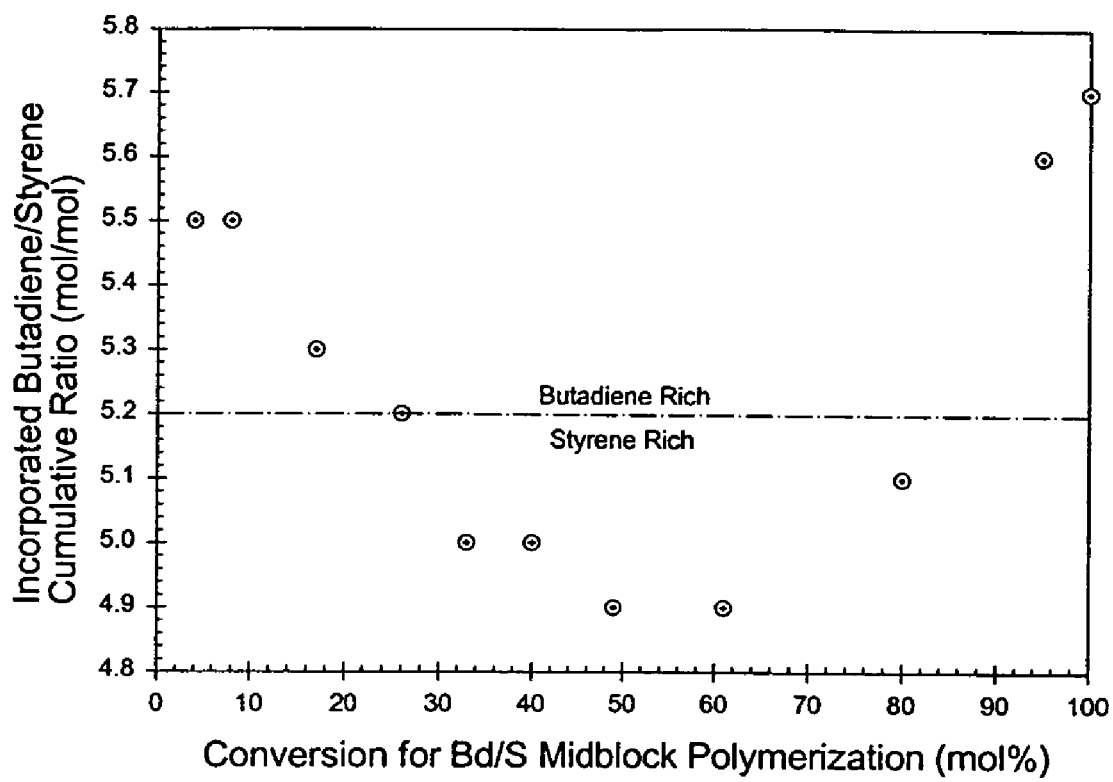
Figure 3:
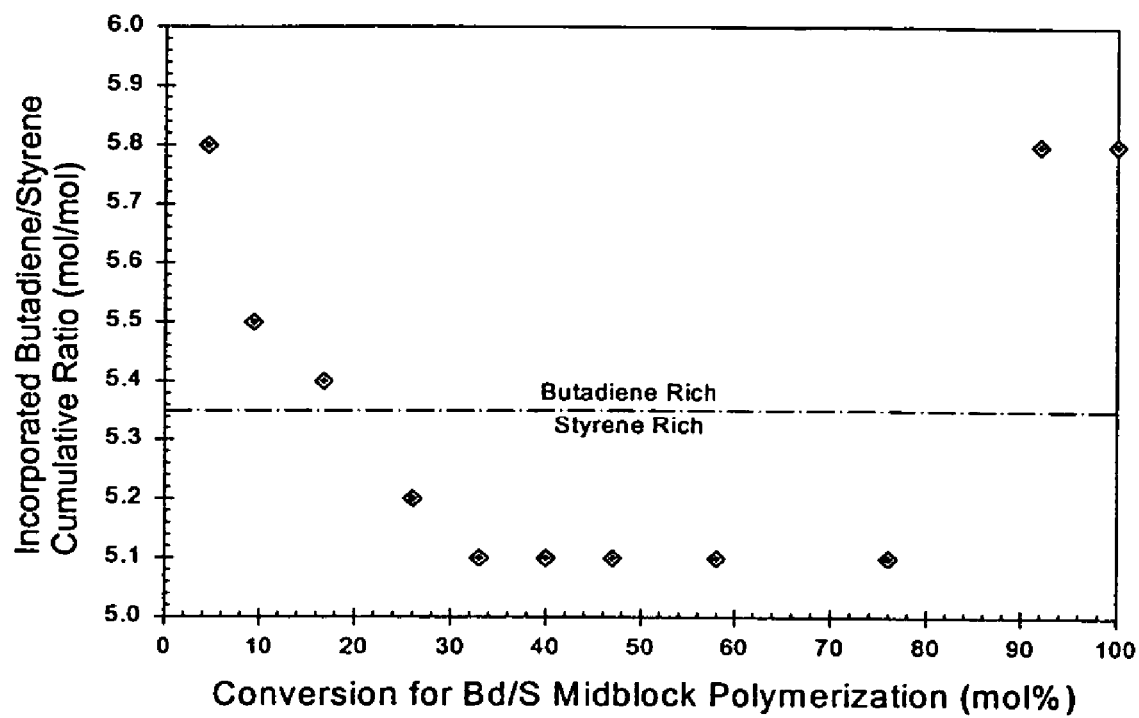

FIGS. 1, 2 and 3 depict the monomer distribution in the Bd/S block of 3 of the polymers prepared in this embodiment. The data in these figures was obtained by taking aliquots of the living polymerization solution at various times during the synthesis of the Step II block of the S—S/Bd-S preparations, that is during the controlled distribution copolymerization of butadiene and styrene portion of the block copolymer preparation. The polybutadiene and polystyrene compositions of each of these aliquots was measured using an H-NMR technique. These "raw data" were adjusted by subtracting out the polystyrene component of the Step I polystyrene block from cumulative polystyrene content of the aliquot. The remainder gave the polystyrene component of the Step II block for each aliquot. The ratio of the polybutadiene content in moles to the polystyrene content in moles (as calculated in this way) was plotted against the level of conversion for each of the aliquots in each of the experiments. The molecular weight of the Step II block for each of the aliquots was obtained by subtracting the molecular weight of the Step I block from the molecular weight of the aliquot. The molecular weight of the Step II block for the final aliquot was taken as the total molecular weight for this region (100% conversion). The level of conversion of each of the aliquots was calculated by taking the ratio of the Step II molecular weight for that aliquot to the molecular weight of the final Step II aliquot for that polymerization.

These plots clearly show the benefit of the present invention. The controlled distribution polymerization, in each case, starts out and ends with a relatively high ratio of incorporated butadiene to styrene (butadiene rich). Clearly there are no runs of polystyrene on either end of the Step II region, thus the control of end block molecular weight is determined only by the size the Step I and Step III styrene charges and the number of living chain ends in those polymerization Steps. The Step I and Step III polystyrene block sizes are not augmented by the addition of polystyrene runs at the start nor at the end of the Step II polymerization.

It is significant to note that even though the center portion of the Step II regions in each of these polymerizations was richer in styrene (had a lower Bd/S ratio) there still were few, if any, styrene multiplets (<10 mol % of the styrene) incorporated into the polymer chain during this stage of the polymerization, as analyzed by H-NMR. A controlled distribution incorporation of the styrene monomer into the polymer chain was observed even though the relative rate of incorporation of styrene to butadiene had increased during this part (from about 40% to about 60% conversion of the Step II polymerization) of the polymerization. Such a controlled distribution incorporation of styrene in these copolymerization reactions seems to be necessary to obtain the desired stiffer stretch performance in the selectively hydrogenated S—S/Bd-S (also known as S—S/E/B—S or styrene-styrene/ethylene/butylene-styrene) product block copolymers.

Illustrative Embodiment #II

In Illustrative Embodiment II various polymers of the present invention are compared against polymers of the prior art. All the polymers were linear selectively hydrogenated ABA block copolymers made with styrene and butadiene monomers, and had nominal or target molecular weights of 10,000 for each of the A end blocks and 80,000 for the B mid block. Polymers 2 and 3 from Illustrative Embodiment I were used in this example. Polymers C-1 and C-2 are for comparison, and do not have any styrene in the B mid block. C-1 has a higher vinyl 1,2 content of 68%, while C-2 has a vinyl 1,2 content of 38%. Polymer C-3 was prepared with about 23 percent weight styrene in the B mid block. Polymer C-3 was prepared in a conventional polymerization process, wherein the mid block was prepared by co-polymerization of butadiene and styrene with a chelating agent, and without controlled addition of the butadiene and styrene monomers.

Rather, all the butadiene and styrene were added to the reactor at the start of the mid block polymerization along with the microstructure modifying agent (1,2 diethoxy propane). Accordingly, Polymer C-3 does not have a "controlled distribution" structure. Details on the block molecular weights and vinyl 1,2 contents are shown in Table 4.

Figure 4:
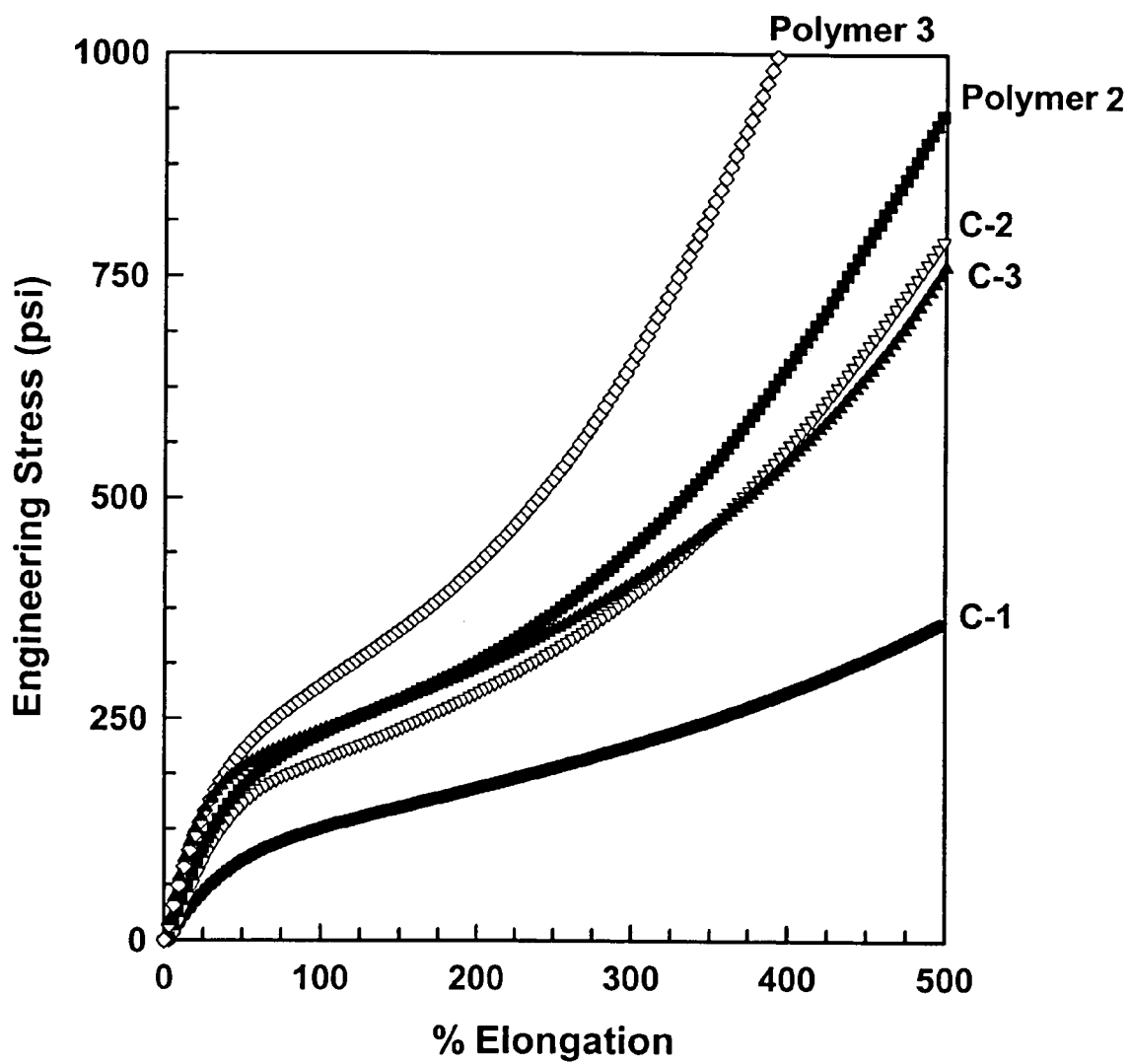
FIG. 4 is a plot of the tensile properties of block copolymers of the present invention containing styrene in the midblocks and having controlled distribution compared to normal and high vinyl polymers. All of the polymers in FIG. 4 had nominal block molecular weights of 10,000-80,000-10,000.

Films were prepared from the polymers and tensile tested according to ASTM D412, and the results are shown in Table 5. One of the objectives of the current invention is to make polymers that have a stiffer elastic response than Polymer C-2, a polymer that is well known in the art. It is the objective of the current invention to increase the rubber stiffness at elongations above 100% thus increasing the elastic power, while producing a limited increase in Young's Modulus, the stiffness at infinitesimal elongations. Increasing the Young's modulus is detrimental to elastomeric performance because it signifies an increase in plasticity. Increasing the vinyl content without the controlled addition of styrene to block B, as shown in Polymer C-1, reduces the stiffness at low and high elongations as shown in FIG. 4. Table 5 shows numerically that increasing the vinyl content reduces both the Young's Modulus, the stiffness at infinitesimal elongations, and the rubber modulus, the rubber stiffness at higher elongations between 100 and 300%. Adding styrene to the midblock in a controlled distribution, however, increases the rubber stiffness as shown in FIG. 4 and table 5, with a small increase in Young's modulus. The importance of controlling the distribution of styrene in the B mid block is illustrated by Polymer C-3. Although it is similar in composition to Polymer 3, its rubber modulus is not increased compared to C-2, the standard of the current art, while its Young's modulus is significantly increased, thus it suffers from both lower elastic power and greater plasticity. The 500% modulus in Table 5 demonstrates this response as well. The polymers of the present invention—Polymers 2 and 3—exhibit stiffer elastic behavior as shown by FIG. 4 and the 500% modulus in Table 5.

Illustrative Embodiment #III

In Illustrative Embodiment # III, a general procedure was used to effectively control the styrene distribution during the anionic copolymerization of 1,3-butadiene (Bd) and styrene (S) in the presence of diethyl ether (DEE), di-n-butyl ether (nBE) or o-dimethoxybenzene (ODMB) while maintaining a low enough vinyl content to produce useful unsaturated products. A number of block copolymer mixtures of (S—S/Bd)$_n$X linear/radial block copolymers were synthesized by coupling of the living S—S/BdLi diblock with tetraethoxy silane (TEOS). In some cases, a number of samples were collected as the copolymerization reaction progressed to enable H-NMR characterization of the distribution of the monomers. Process data corresponding to specific reactions is summarized in Table 6.

For Step I, an appropriate amount of polymerization grade cyclohexane was charged to a well-mixed 227-liter stainless steel reactor vessel at 30° C. Pressure in the reactor vessel was controlled with nitrogen gas. Styrene monomer was charged to the reactor at 30° C. 10 ml increments of sec-butyllithium (12% wt.) were added to the reactor to titrate the cyclohexane and styrene monomer mixture. The titration endpoint was determined with an on-line colorimeter. After titration, a gig of excess sec-butyllithium was then added to the reactor to initiate the anionic polymerization of the living polystyrene blocks. The temperature was allowed to increase to 55° C. and the reaction was carried out to 99.9% conversion of the styrene. This completed the first styrene block of this block copolymer, (S)—.

For Step II, an appropriate amount of polymerization grade cyclohexane was charged to a well-mixed 492 liter stainless steel reactor vessel at 30° C. First, all of the styrene monomer required in the Step II reaction was charged to the reactor. Second, a fraction of the butadiene monomer required in the Step II reaction was charged to the reactor. Third, an appropriate amount of the distribution agent was charged to the reactor. Fourth, 10 ml increments of sec-butyllithium (12% wt.) were added to the reactor to titrate the cyclohexane, styrene monomer, butadiene monomer and modifier mixture. The titration endpoint was determined with an on-line colorimeter. After titration, the living polystyrene chains were transferred via nitrogen pressure from the Step I reactor vessel to the Step II reactor vessel to initiate the Step II copolymerization reaction of styrene and butadiene at 30° C. After the time interval specified in Table 6, the remainder of the butadiene monomer was dosed to the Step II reactor at the specified rate. The polymerization was allowed to continue at about 50° C. Some time following the end of the programmed diene addition, generally about 30–90 minutes, the signal from an in-line colorimeter which detects the presence of styryllithium chain ends, was observed to increase sharply. This corresponds to the onset of fast styrene polymerization. Following the polymerization of the remaining styrene, which occurs in about 10 minutes, the polymer anion is either coupled as described below, or capped by the addition of a small quantity (1–2 kg.) of butadiene. As expected, following the addition of the butadiene, the signal from the colorimeter decreases dramatically, indicative of the conversion of the chain ends to polybutadienyllithium. This completed the addition of a styrene-butadiene randomized midblock segment to the Step I polystyrene block. This segment becomes richer in styrene as you proceed away from the Step I block, until reaching the short terminal butadiene block.

Coupling with tetraethoxy silane produced the final product. About 0.4 to 0.5 moles of the silane were added per mole of polymer anion. Under these conditions, the predominant coupled species is the linear product, although about 10%–30% of the 3-arm radial polymer is also formed. Coupling efficiency defined as the ratio of coupled species to coupled species plus diblock as determined from GPC area, was generally improved by capping with butadiene. Coupling efficiencies in excess of 90% were obtained in these examples. Adding an appropriate amount of high-grade methanol to the final reactor solution terminated any living polymer chains. If a short styrene block is formed at the end of the copolymerization due to tapering, this process guarantees that it will be located in the central region of the midblock segment. Table 7 shows the various unsaturated block copolymers prepared in this example.

High midblock styrene/high vinyl polymers can also be prepared by this general procedure, as illustrated by Polymer #21 in Table 7, which was prepared by essentially the same process as described above except the diethyl ether concentration was increased to 6% wt. and the rate of butadiene addition was increased to reflect the faster reaction rate in the presence of higher ether levels. In order to insure an adequate excess of butadiene, the butadiene was added at a rate of about 0.24 kg/min for the first few minutes, and the rate was decreased. The average feed rate was about 0.2 kg/min.

Tables 7 and 1a list the various analytical results for the unsaturated polymers (unsaturated polymers are polymers 16 to 23). Block I MW is the molecular weight of the first A or polystyrene block in units of 1000, Block II MW is the cumulative molecular weight of the B or controlled distribution block in units of 1000 and Block III MW is the molecular weight of the final A or polystyrene block in units of 1000. Regarding Step II MW, the first number is the 1,3-butadiene portion and the second number is the styrene portion. For example, in Polymer #16 the B block has a molecular weight of 85,000 butadiene and 31,000 styrene, for a total of 116,000. The weight percent styrene in the mid-block is about 26%. The 1,2-vinyl configuration is given, along with the percent styrene in the entire polymer and in the mid block. For example, for Polymer #16, the entire polymer has about 42 weight percent styrene and the mid-block has about 26 weight percent styrene ("Calc. Mid PSC" in Table 1a). Coupling efficiency (or CE) is given for each polymer. The styrene blockiness for each polymer is calculated and shown in Table 1a ("Calc. Mid Blocky"). Finally the melt flow rate is given for some of the polymers.

Illustrative Embodiment #IV

In this example one controlled distribution block copolymer (Polymer #17) was compared against a commercial sample of Styroflex® BX6105, an unsaturated SBS block copolymer from BASF, which has a random styrene/butadiene mid-block. Polymer #17 is made with a controlled distribution styrene/butadiene mid-block according to the present invention. Both have similar overall styrene contents as shown in Table 8. As shown in Table 8, Polymer #17 has a much improved melt flow measured under 200° C./5 kg conditions. Hardness and haze were measured on injection molded plaques with melt temperatures/injection pressures of 204° C./1000 psi and 190° C./800 psi for Styroflex and Polymer #17, respectively. Polymer #17 has a lower shore A hardness by approximately 20 points and 57% lower haze than Styroflex. Mechanical properties were measured on compression-molded plaques pressed at 175° C. and 1250 psi. Even though the tensile strengths are nearly identical, Polymer #17 has a higher elongation at break. Polymer #17 is also more compliant than Styroflex as indicated by the consistently lower moduli between 25% and 500%. Under a cyclic loading condition, Polymer #17 is more elastic as it recovers twice as much energy with half the permanent set of Styroflex.

Figure 5:
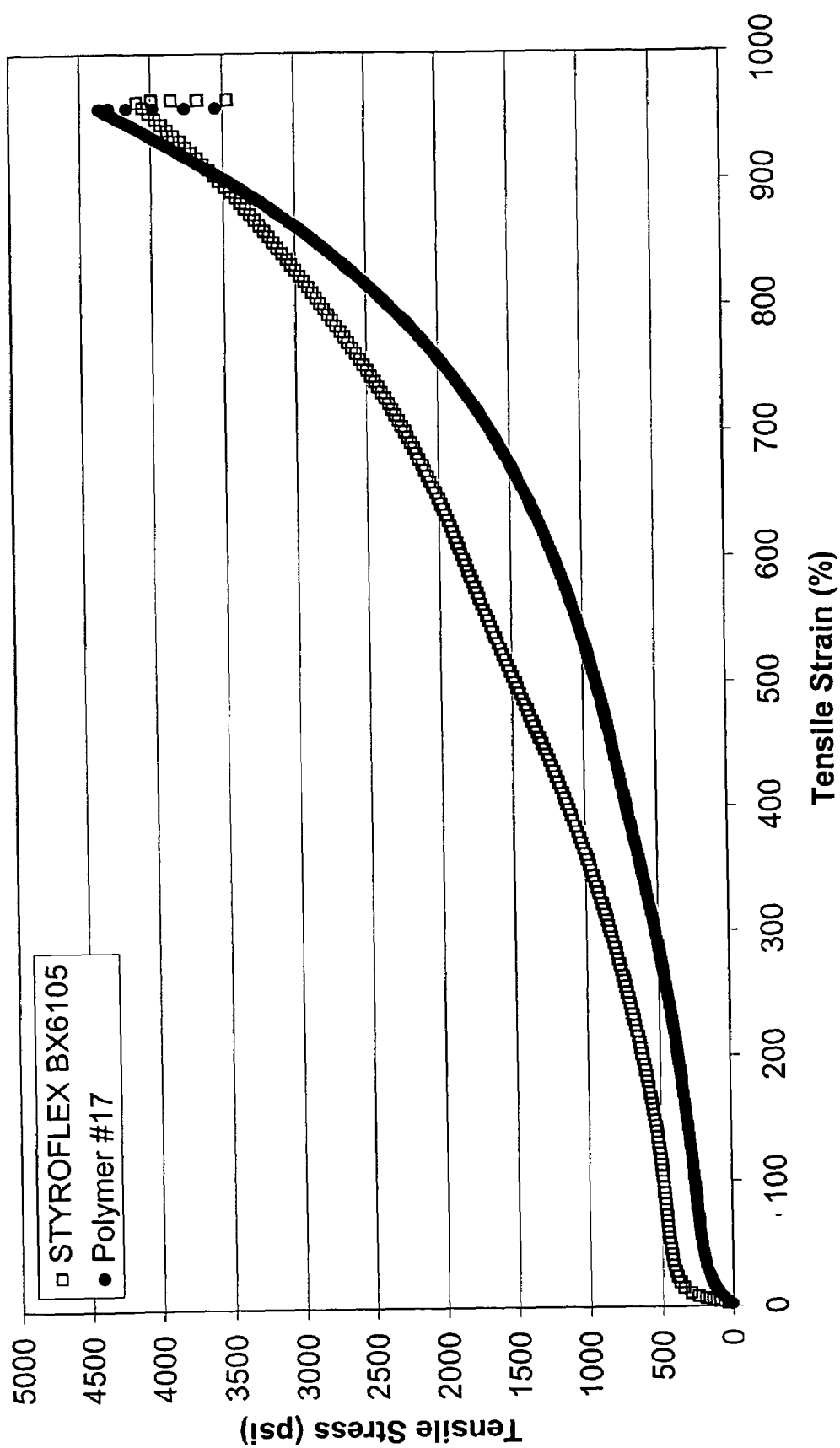
FIG. 5 compares the stress-strain curves of a controlled distribution polymer of the present invention against a commercial product with similar styrene contents, but not a controlled distribution.

FIG. 5 demonstrates the benefit of the elastomers of the current invention. An elastomer is generally characterized by a low initial force at low deformations, for example below 25% elongation, as opposed to a plastic material which has a much higher initial force. The controlled distribution polymer #17 clearly exhibits much lower force at low elongations compared to Styroflex, a polymer typical of the current art of randomized midblock polymers with a similar total styrene content. The stiffness at low elongations is typically characterized by the tensile modulus, or Young's modulus, which is the slope of the stress strain curve at infinitesimal elongation. For example the Young's modulus of polymer #17 is only 1,400 psi (10 MPa) while for Styroflex it is 5,000 psi (35 MPa). The rubber modulus, or slope between 100 and 300% elongation for polymer#17 is slightly higher, 94 psi (0.65MPa), than for Styroflex, 90 psi (0.62 MPA). Thus the controlled distribution polymer retains the stiff stretch at high elongations and high tensile strength of a random polymer but with the added benefit of much more elastic behavior at low elongations. See Table 10, which also displays the glass transition temperature (Tg) for the B mid-blocks of various polymers. For Polymers 19* and 20* the Tg were taken after hydrogenation.

Illustrative Embodiment #V

In this example two different controlled distribution block copolymers (#15 and #15FG) were compared with KRATON FG-1901 in blends with Nylon 6,6 (Zytel 101) at 15 and 20% by weight in a twin screw extruder. Polymer #15FG was prepared by maleating Polymer #15 to a level of 1.7% weight bound maleic anhydride in a Berstorff twin screw extruder. KRATON FG 1901 is an S-EB—S block copolymer that was maleated to a similar level of 1.7% weight. The blends were injection molded and the impact strength was measured using an Izod impact tester. Samples were taken both from the blind end of the mold and the gate end of the mold to minimize molding effects.

As shown in Table 9, the addition of maleic anhydride dramatically improves the ability of Polymer #15FG to toughen Nylon 6,6. The greater toughness presented by the maleated Polymer #15FG might allow less modifier to be used to achieve the same toughness compared to available materials.

TABLE 1

Controlled Distribution Polymers

| Polymer Number | Step I MW(k) | Step II MW(k) | Step III MW(k) | 1,2-BD (%) | PSC (%) |
|---|---|---|---|---|---|
| 1 | 10.5 | 106.3 | 118.6 | 34.5 | 29.75 |
| 2 | 10.5 | 98.6 | 110.8 | 38 | 29.53 |
| 3 | 9.2 | 90.6 | 99.9 | 35.8 | 40.12 |
| 4 | 9.7 | 92.3 | 102.8 | 35.3 | 48.3 |
| 5 | 13.9 | 140.8 | 158.2 | 35 | 50.15 |
| 6 | 10.6 | 101.4 | 112.6 | 36.2 | 40 |
| 7 | 10.3 | 99.3 | 111.9 | 37.1 | 40.31 |
| 8 | 8.2 | 91.2 | 98.9 | 37 | 37 |
| 9 | 32 | 162 | 194.8 | 34.3 | 58.1 |
| 10 | 29.4 | 159.4 | 189.2 | 33.6 | 65.8 |
| 11 | 24 | 120.9 | 145.8 | 33.6 | 58.9 |
| 12 | 30.3 | 164.3 | 196.8 | 35.4 | 48.2 |
| 13 | 29.9 | 163.3 | 195.9 | 34.5 | 58.2 |
| 14 | 8.4 | 88.5 | 95.8 | 36.1 | 38.3 |
| 15 | 9 | 86.8 | 95.5 | 35.9 | 39.3 |
| 24 | 29 | 159 | 188 | 35 | 58 |
| 25 | 9.5 | 89.5 | 99 | 36 | 39 |
| 26 | 7.3 | 43.1 | 50.4 | 36.7 | 47 |
| 27 | 7.5 | 70.1 | 77.4 | 36.1 | 40 |
| 28 | 7.8 | 39 | — | 36 | 39 | where "MW(k)" = true molecular weight in thousands, "1,2-BD, %" is the vinyl content of the butadiene part of the polymer, and "PSC (%)" = wt % of styrene in the final polymer. Molecular weights are cumulative for the segments (Step II MW = segment MW for Step I and Step II; Step III MW is the final MW for the three block copolymers.

TABLE 1a

NMR Results for Polymers at the end of Step II

| Polymer Number | Expt. NMR PSC | Expt. NMR Blocky | Calc. Mid PSC | Calc. Mid Blocky |
|---|---|---|---|---|
| 1 | 22.2 | 50 | 13.7 | 10 |
| 2 | 22.2 | 51 | 12.9 | 6 |
| 3 | 33.5 | 34 | 26.0 | 5 |
| 4 | 44.5 | 27 | 38.0 | 4 |
| 5 | 44.7 | 29 | 38.6 | 9 |
| 6 | 33.5 | 33 | 25.7 | 3 |
| 7 | 33.5 | 34 | 25.8 | 4 |
| 8 | 32.1 | 30 | 25.4 | 3 |
| 9 | 49.9 | 43 | 37.6 | 6 |
| 10 | 59.0 | 34 | 49.7 | 4 |
| 11 | 50.4 | 40 | 38.1 | 1 |
| 12 | 38.8 | 48 | 25.0 | 1 |
| 13 | 50.0 | 39 | 38.8 | 4 |
| 14 | 32.3 | 30 | 25.2 | 1 |
| 15 | 33.4 | 33 | 25.7 | 3 |
| 16 | 42.3 | 56 | 26.9 | 12 |
| 17 | 61.8 | 45 | 49.9 | 11 |
| 18 | 40.0 | 59 | 26.0 | 22 |
| 19 | 75.4 | 56 | 65.7 | 30 |
| 20 | 38.7 | 57 | 23.8 | 13 |
| 21 | 76.9 | 55 | 67.1 | 27 |
| 22 | 74.3 | 59 | 63.4 | 32 |
| 23 | 64.5 | 57 | 53.8 | 33 |
| 24 | 50.7 | 42 | 39.7 | 9 |
| 25 | 33.3 | 31 | 25.7 | 0 |
| 26 | 38.5 | 46 | 26.0 | 4 |
| 27 | 33.5 | 34 | 25.5 | 3 |
| 28 | 39.4 | 56 | 25.4 | 16 |

TABLE 2

Conditions for Polymerization of S/B Mid Block Copolymers

| | | Polymer # | | | | | | | |
|---|---|---|---|---|---|---|---|---|---|
| | | 1 | 2 | 3 | 4 | 5 | 6 | 7 | 8 |
| Step I | | | | | | | | | |
| Charge Cyclohexane | kg | 40 | 40 | 40 | 40 | 59.8 | 60 | 60.4 | 40.8 |
| Charge Styrene | kg | 10.04 | 10 | 10.2 | 10.1 | 15.05 | 15.1 | 15.1 | 10.2 |
| sBuLi Titration (12 wt %) | ml | 20 | 20 | 20 | 55 | 10 | 5 | 20 | 10 |
| Excess sBuLi (12 wt %) | ml | 755 | 755 | 800 | 754 | 745 | 1065 | 1062 | 875 |
| Start Temperature | Deg C. | 30 | 30 | 30 | 30 | 30 | 30 | 30 | 30 |
| Final Temperature | Deg C. | 55 | 50 | 55 | 55 | 55 | 55 | 55 | 55 |
| Step II | | | | | | | | | |
| Charge Cyclohexane | kg | 170 | 165 | 165 | 200 | 198 | 283.4 | 281 | 202.7 |
| Charge Styrene | kg | 5.05 | 5 | 10.02 | 18.1 | 18.1 | 17.12 | 17.12 | 11.98 |
| Charge Butadiene | kg | 17.5 | 17.23 | 15.5 | 15.05 | 15.1 | 25.6 | 25.5 | 18 |
| Charge Diethyl Ether | kg | 15 | 15.1 | 15.1 | 18.3 | 18 | 25.7 | 25.6 | 18.2 |
| sBuLi Titration (12 wt %) | ml | 30 | 25 | 20 | 55 | 50 | 130 | 100 | 70 |
| Transfer Step I Cement | kg | 25.1 | 25.5 | 25.2 | 30.8 | 30.5 | 42.3 | 42.9 | 25.6 |
| Step I Cement Transfer Rate | kg/min | n/a | n/a | n/a | n/a | n/a | n/a | n/a | n/a |
| Start Butadiene Program @ | min | 10 | 10 | 10 | 10 | 10 | 10 | 10 | 10 |
| Program Butadiene | kg | 17.5 | 17.77 | 14.5 | 15.02 | 15 | 25.5 | 25.1 | 17.8 |
| Butadiene Program Rate | kg/min | 0.29 | 0.5 | 0.5 | 0.5 | 0.5 | 0.5 | 0.5 | 0.5 |
| Start Temperature | Deg C. | 30 | 30 | 30 | 30 | 30 | 30 | 30 | 30 |
| Final Temperature | Deg C. | 55 | 55 | 55 | 55 | 55 | 55 | 55 | 55 |
| Step III | | | | | | | | | |
| Program Styrene | kg | 5 | 5 | 4.9 | 5.9 | 5.8 | 8.5 | 8.4 | 4.2 |
| Styrene Program Rate | kg/min | n/a | n/a | n/a | n/a | n/a | n/a | n/a | n/a |
| MeOH Termination (100 wt %) | ml | 20.2 | 21 | 20.3 | 25 | 16 | 35 | 35 | 20 |
| Start Temperature | Deg C. | 55 | 55 | 55 | 55 | 55 | 55 | 55 | 55 |
| Final Temperature | Deg C. | 57 | 57 | 55 | 55 | 55 | 55 | 55 | 55 |
| Finished Batch | | | | | | | | | |
| Total Polymer | kg | 50 | 50 | 50 | 60 | 60 | 85 | 85 | 60 |
| Total Cement | kg | 250 | 250 | 250 | 300 | 300 | 425 | 425 | 300 |
| Solids | wt % | 20 | 20 | 20 | 20 | 20 | 20 | 20 | 20 |

TABLE 3

Polymer Architecture for A1-B-A2 Polymers

| | Block Size (×10³) | | |
|---|---|---|---|
| Polymer | A1 | B | A2 |
| 1 | 10.5 | 95.8 | 12.3 |
| 2 | 10.5 | 88.1 | 12.2 |
| 3 | 9.2 | 81.4 | 9.3 |
| 4 | 9.7 | 82.6 | 10.5 |
| 5 | 13.9 | 126.9 | 17.4 |
| 6 | 10.6 | 90.8 | 11.2 |
| 7 | 10.3 | 89.0 | 12.6 |
| 8 | 8.2 | 62.3 | 7.7 |
| 9 | 32 | 81.6 | 32.8 |
| 10 | 29.4 | 64.7 | 29.8 |
| 11 | 24 | 59.9 | 24.9 |
| 12 | 30.3 | 102 | 32.5 |
| 13 | 29.9 | 81.9 | 32.6 |
| 14 | 8.4 | 59.1 | 7.3 |
| 15 | 9 | 58 | 8.7 |
| 24 | 29 | 130 | 29 |
| 25 | 9.5 | 80 | 9.5 |
| 26 | 7.3 | 35.8 | 7.3 |
| 27 | 7.5 | 62.6 | 7.5 |
| 28 | 7.8 | 31.5 | — |

TABLE 4

Polymer Architecture for A1-B-A2 Polymers

| | Block Size (×1000) | | | Vinyl 1,2 content of Butadiene (%) | Percent Styrene in B mid block (%) |
|---|---|---|---|---|---|
| Polymer | A1 | B | A2 | | |
| 2 | 10.5 | 88.1 | 12.2 | 38 | 12.9 |
| 3 | 9.2 | 81.4 | 9.3 | 35.8 | 26 |
| C-1* | 10 | 80 | 10 | 68 | 0 |
| C-2* | 10 | 80 | 10 | 38 | 0 |
| C-3* | 10 | 80 | 10 | 52.5 | 22.9 |

*actual block sizes were not measured after synthesis for these 3 polymers, and only target block mol weights are given.

TABLE 5

Tensile Properties

| | | Polymer | | | | |
|---|---|---|---|---|---|---|
| | | C-1 | C-2 | 2 | 3 | C-3 |
| Stress (psi) at | 50% | 90.5 | 154.5 | 170.5 | 200 | 196 |
| Stress (psi) at | 100% | 127.5 | 203 | 231 | 273.5 | 232 |
| Stress (psi) at | 200% | 173 | 278 | 312 | 401.5 | 308 |
| Stress (psi) at | 300% | 222.5 | 383.5 | 437 | 606.5 | 401 |
| Stress (psi) at | 500% | 367 | 778.5 | 908 | 1304 | 775 |
| Stress at Break (psi) | Max. Stress (psi) | 3981.5 | 4785.5 | 4575.5 | 4723.5 | 4750 |
| Stress at Break (%) | Ultimate Elongation (%) | 1396.5 | 941.5 | 871.5 | 756 | 1070 |
| Young's Modulus (MPa) | | 2.3 | 4.4 | 4.7 | 5.8 | 7.7 |
| Rubber Modulus (MPa) | | 0.32 | 0.45 | 0.54 | 0.67 | 0.37 |

TABLE 6

Conditions for Polymerizations of Low Vinyl S/Bd Mid Block Copolymers.

| | | Polymer # | | | | | |
|---|---|---|---|---|---|---|---|
| | | 16 | 17 | 18 | 19 | 20 | 22 |
| Step I | | | | | | | |
| Charge Cyclohexane | kg | 106 | 104 | 96 | 102 | 60 | 100 |
| Charge Styrene | kg | 26 | 26.1 | 24 | 25 | 15 | 25.5 |
| Excess sBuLi (12 wt %) | ml | 1160 | 1160 | 1470 | 860 | 900 | 880 |

TABLE 6-continued

Conditions for Polymerizations of Low Vinyl S/Bd Mid Block Copolymers.

|  |  | Polymer # | | | | | |
|---|---|---|---|---|---|---|---|
|  |  | 16 | 17 | 18 | 19 | 20 | 22 |
| Start Temperature | Deg C. | 30 | 30 | 30 | 30 | 30 | 30 |
| Final Temperature | Deg C. | 55 | 50 | 55 | 55 | 55 | 55 |
| Step II |  |  |  |  |  |  |  |
| Charge Cyclohexane | kg | 278 | 273 | 252 | 193 | 193 | 194 |
| Charge Styrene | kg | 16.9 | 32.2 | 16.1 | 31.1 | 12 | 31.2 |
| Charge Butadiene | kg | 16.9 | 10.7 | 16 | 1.8 | 12 | 1.7 |
| Distribution Agent |  | DEE | DEE | nBE | DEE | ODMB | ODMB |
| Charge Dist. Agent | g | 2100 | 2300 | 4000 | 1700 | 10.5 | 12.25 |
| Dist. Agent Concentration | % Wt. | 0.5 | 0.5 | 1.0 | 0.5 | 0.0035 | 0.0035 |
| Transfer Step I Cement | kg | 103.5 | 112.5 | 80.4 | 110.4 | 60 | 107.5 |
| Start Butadiene Program @ | min | 10 | 1 | 1 | 1 | 1 | 1 |
| Program Butadiene | kg | 33.7 | 21.3 | 32 | 14.6 | 22 | 14.6 |
| Butadiene Program Rate | kg/min | 0.37 | 0.25 | 0.54 | 0.24 | 0.32 | 0.2 |
| Charge Butadiene Cap | kg | None | None | None | 0.8 | 1.8 | 0.8 |
| Start Temperature | Deg C. | 30 | 30 | 30 | 30 | 30 | 30 |
| Final Temperature | Deg C. | 50 | 50 | 50 | 50 | 50 | 50 |
| Step III |  |  |  |  |  |  |  |
| Charge TEOS | g | 131.2 | 131.2 | 139 | 97.3 | 93.7 | 97.3 |
| Finished Batch |  |  |  |  |  |  |  |
| Total Polymer | kg | 88 | 87 | 80 | 70 | 60 | 70 |
| Total Cement | kg | 451 | 452 | 400 | 354 | 300 | 362 |
| Solids | wt % | 19 | 19 | 20 | 20 | 20 | 19 |

TABLE 7

Analytical Results for Unsaturated S/Bd Mid-Block Polymers

| Polymer No. | Block I MW | Block II MW | Block III MW | Distribution Agent | 1,2-BD (%) | PSC (%) | CE (%) | MFR (200 C/5 kg) (g/10 min) |
|---|---|---|---|---|---|---|---|---|
| 16 | 15.5 | 85/31 | 15.5 | DEE | 23.5 | 42 | >90 | 0.6 |
| 17 | 15.6 | 50/50 | 15.6 | DEE | 24.6 | 63 | >90 | 17.6 |
| 18 | 11.7 | 75/25 | 11.7 | nBE | 22.8 | 40 | 70 | 10.8 |
| 19 | 21 | 38/69 | 21 | DEE | 24.3 | 76 | 95 | 11.7 |
| 20 | 12.5 | 78/25 | 12.5 | ODMB | 23.7 | 38.8 | 92 |  |
| 21 | 21.2 | 36/65 | 21.2 | DEE | 32.6 | 76 | 95 |  |
| 22 | 20.1 | 30/65 | 20.1 | ODMB | 30 | 74 | 94 |  |
| 23 | 14.8 | 49/49 | 14.8 | ODMB | 25 | 64.5 | 90 |  |

TABLE 8

|  | Polymer #17 | Styroflex BX6105 |
|---|---|---|
| PSC (%) | 63 | 66 |
| MFR (g/10 min) | 17.7 | 10.5 |
| Shore A Hardness (10s) | 62 | 84 |
| Haze (%) | 21.8 | 51.3 |
| Tensile |  |  |
| TS (psi) | 4298 | 4338 |
| Elongation (%) | 950 | 734 |
| 25% Modulus (psi) | 152 | 429 |
| 50% Modulus (psi) | 203 | 465 |
| 100% Modulus (psi) | 255 | 524 |
| 200% Modulus (psi) | 366 | 760 |
| 300% Modulus (psi) | 517 | 1122 |
| 500% Modulus (psi) | 917 | 2125 |
| 150% Hysteresis |  |  |
| Recovered Energy (%) | 59.1 | 30.7 |
| Permanent Set (%) | 18.9 | 38.9 |

TABLE 9

|  | Formulation (% weight) | | | | |
|---|---|---|---|---|---|
|  | 9-1 | 9-2 | 9-3 | 9-4 | 9-5 |
| Polymer # 15 | 20 |  |  |  |  |
| Polymer #15FG |  | 15 | 20 |  |  |
| KRATON FG 1901 polymer |  |  |  | 15 | 20 |
| Nylon 6,6 | 80 | 85 | 80 | 85 | 80 |

TABLE 9-continued

| | Formulation (% weight) | | | | |
|---|---|---|---|---|---|
| | 9-1 | 9-2 | 9-3 | 9-4 | 9-5 |
| Notched Izod Impact Test (foot pounds per inch) | | | | | |
| Gate end | 2.05 | 20.7 | 25.1 | 13.2 | 21.2 |
| Blind end | 2.08 | 23.6 | 25.9 | 13.5 | 23.1 |

TABLE 10

| Polymer | Young's Modulus (MPa) | Rubber Modulus (MPa) | Tg of Mid-Block |
|---|---|---|---|
| 2 | 4.7 | 0.54 | −31.3 |
| 3 | 5.8 | 0.67 | −22.7 |
| 5 | | | −12.6 |
| C-1 | 2.3 | 0.32 | −31.8 |
| C-2 | 4.4 | 0.45 | −37.4 |
| C-3 | 7.7 | 0.37 | |
| 17 | 10 | 0.65 | +4.6 |
| Styroflex | 35 | 0.62 | |
| 19 | | | +26 |
| 19* | | | +11.5 |
| 20* | | | +20.3 |

What is claimed is:

1. A process for preparing sulfonated hydrogenated block copolymers comprising reacting a block copolymer with a sulfonation reagent that selectively sulfonates the alkenyl arene blocks wherein the hydrogenated block copolymer has the general configuration A-B, A-B-A, (A-B)$_n$, (A-B-A)$_n$, (A-B-A)$_n$X, (A-B)$_n$X or mixtures thereof, where n is an integer from 2 to about 30, and X is a coupling agent residue and wherein:
   a. prior to hydrogenation each A block is a mono alkenyl arene polymer block and each B block is a controlled distribution copolymer block of at least one conjugated diene and at least one mono alkenyl arene;
   b. subsequent to hydrogenation about 0–10% of the arene double bonds have been reduced, and at least about 90% of the conjugated diene double bonds have been reduced;
   c. each A block having a number average molecular weight between about 3,000 and about 60,000 and each B block having a number average molecular weight between about 30,000 and 300,000;
   d. each B block comprises terminal regions adjacent to the A block that are rich in conjugated diene units and one or more regions not adjacent to the A block that are rich in mono alkenyl arene units;
   e. the total amount of mono alkenyl arene in the hydrogenated block copolymer is about 20 percent weight to about 80 percent weight; and
   f. the weight percent of mono alkenyl arene in each B block is between about 10 percent and about 75 percent,
   g. wherein the styrene blockiness index of the block B is less than about 40 percent.

2. The process of claim 1 wherein the sulfonation reagent is an acyl sulfate.

3. The process of claim 2 wherein the acyl sulfate is acetyl sulfate.

4. The process of claim 3 additionally comprising reacting the sulfonated block copolymer with an ionizable metal compound to obtain a metal salt.

5. The process of claim 4 wherein the ionizable metal compound is a $Zn^{2+}$ compound.

6. The process of claim 5 wherein the $Zn^{2+}$ compound is a zinc acetate.

7. The process of claim 1 wherein said mono alkenyl arene is styrene and said conjugated diene is selected from the group consisting of isoprene and butadiene.

8. The process of claim 1 wherein said conjugated diene is butadiene, and wherein about 20 to about 80 mol percent of the condensed butadiene units in block B have 1,2-configuration prior to hydrogenation.

9. The process of claim 1 wherein the weight percentage of styrene in the B block is between about 10 percent and about 40 percent, and the styrene blookiness index of the B block is less than about 10 percent, said styrene blockiness index being the proportion of styrene units in the block B having two styrene neighbors on the polymer chain.

10. The process of claim 1 wherein before functionalization said A block has a glass transition temperature of plus 80° C. to plus 110° C. and said B block has a glass transition temperature of at least above about minus 60° C.

11. The process of claim 10 wherein before functionalization said B block has a glass transition temperature of between minus 40° C. and plus 30° C.

12. The process of claim 4 wherein the ionizable metal compound comprises $Na^+$, $K^+$, $Li^+$, $Cs^+$, $Ag^+$, $Hg^+$, $Cu^+$, $Mg^{2+}$, $Ca^{2+}$, $Sr^{2+}$, $Ba^{2+}$, $Cu^{2+}$, $Cd^{2+}$, $Hg^{2+}$, $Sn^{2+}$, $Pb^{2+}$, $Fe^{2+}$, $Co^{2+}$, $Ni^{2+}$, $Zn^{2+}$, $Al^{3+}$, $Sc^{3+}$, $Fe^{3+}$, $La^{3+}$ or $Y^{3+}$.

13. The process of claim 4 wherein the ionizable metal compound comprises a hydroxide, an oxide, an alcoholate, a carboxylate, a formate, an acetate, a methoxide, an ethoxide, a nitrate, a carbonate or a bicarbonate.

14. The process of claim 1 wherein the styrene blockiness index of the block B is less than about 10 percent.

* * * * *